United States Patent [19]

Sato

[11] 4,185,307
[45] Jan. 22, 1980

[54] TAPE CASSETTE

[75] Inventor: Masaaki Sato, Hachioji, Japan

[73] Assignee: Olympus Optical Co., Ltd., Tokyo, Japan

[21] Appl. No.: 890,815

[22] Filed: Mar. 27, 1978

Related U.S. Application Data

[63] Continuation of Ser. No. 749,408, Dec. 10, 1976, abandoned.

[30] Foreign Application Priority Data

Dec. 23, 1975 [JP] Japan .............................. 50/153025

[51] Int. Cl.² ........................................... G11B 15/26
[52] U.S. Cl. ...................................................... 360/94
[58] Field of Search ........................................ 360/94

[56] References Cited

U.S. PATENT DOCUMENTS

| 3,800,321 | 3/1974 | Bolick | 360/94 |
| 3,964,099 | 6/1976 | Sato | 360/94 |

*Primary Examiner*—Robert S. Tupper
*Attorney, Agent, or Firm*—Ostrolenk, Faber, Gerb & Soffen

[57] ABSTRACT

A tape cassette is disclosed which comprises a miniature tape cassette and an adaptor therefor, which when combined together has substantially the same configuration and the same size as a standard tape cassette used in a recorder-player. The adaptor includes at least one tape hub-like transmission member which is adapted to be engaged with and driven by a drive shaft of the recorder-player, and when it is combined with the miniature tape cassette, at least one tape winding hub of the latter is driven by the transmission member of the adaptor for rotation, thus taking up a tape thereon. The miniature tape cassette can also be used alone.

11 Claims, 5 Drawing Figures

TAPE CASSETTE

RELATED APPLICATIONS

This is a continuation of U.S. patent application Ser. No. 749,408 filed Dec. 10, 1976, now abandoned.

BACKGROUND OF THE INVENTION

The invention relates to a tape cassette, and more particularly to a tape cassette which comprises a combination of a miniature tape cassette and an adaptor, permitting a selective use of the miniature tape cassette alone or the use of the combination as a standard cassette.

A video tape cassette which is used in a video tape recorder of cassette type is relatively large in size as compared with a tape cassette which is employed for acoustic recording purposes. As a consequence, a video camera which employs the video cassette becomes large in size, which is inconvenient for portable use. When using the video camera on a trip, for example, it is more desirable that the camera be small in size and light in weight rather than to have a long playing time of the video camera. To this end, the tape cassette must be of a miniature size. However, a video player which is in widespread use for home applications is only capable of playing a tape cassette of a standard size. Thus, there must be provided another video player which is capable of playing a miniature tape cassette. However, the resulting lack in economy cannot be accommodated for in home applications.

SUMMARY OF THE INVENTION

It is an object of the invention to provide a tape cassette comprising a combination of a miniature tape cassette and an adaptor which is convenient for portable use and which permits the combination to be used as a tape cassette of a standard size.

The combination cassette is not limited in use to a video tape recorder, but the miniature cassette alone can also be used in an acoustic tape recorder of a miniature size. In addition, the miniature cassette may be combined with the adaptor to be played in a tape recorder which is designed to be used with a standard size cassette.

DETAILED DESCRIPTION OF EMBODIMENT

Figure 1:
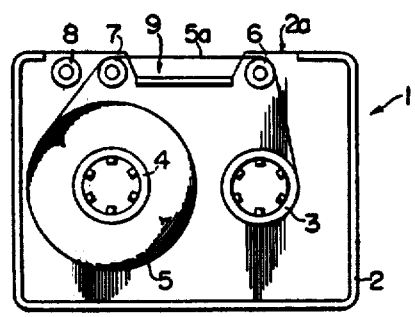
FIG. 1 is a plan view of a lower half of a conventional video tape cassette of a standard size.
Figure 2:
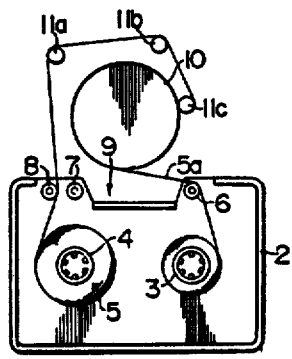
FIG. 2 is a similar plan view, illustrating a manner of use of the tape cassette shown in FIG. 1.

Referring to FIG. 1, there is shown a tape cassette 1 of a standard size which is used in a conventional video tape recorder. Specifically, the lower half 2 of the cassette 1 is shown, with the upper half being removed. As is well known, the cassette 1 internally houses a pair of tape hubs 4, 3 which are rotatably mounted therein. A length of magnetic tape 5 has its opposite ends secured to the respective hubs and wound thereon. A portion 5a of the tape running across the hubs 4, 3 extends across a pair of rollers 6, 7 thus passing through a window slot 9 formed in the front face of the cassette, said tape being maintained in taut condition. The window slot 9 which is centrally formed in the front face of the cassette is formed as a notch, permitting the tape to be pulled externally of the cassette. With a video tape, the tape is pulled externally through the window slot 9 utilizing a movable guide roller, not shown, and is passed around a rotary drum 10, shown in FIG. 2, by using known means. In this instance, a diverting roller 8 takes the place of the roller 7. In the example shown in FIG. 2, the tape 5 is passed around a plurality of additional diverting rollers 11a, 11b and 11c. A video camera includes additional mechanisms, which however have no direct bearing with the present invention and will not be described for purposes of brevity.

Figure 3:
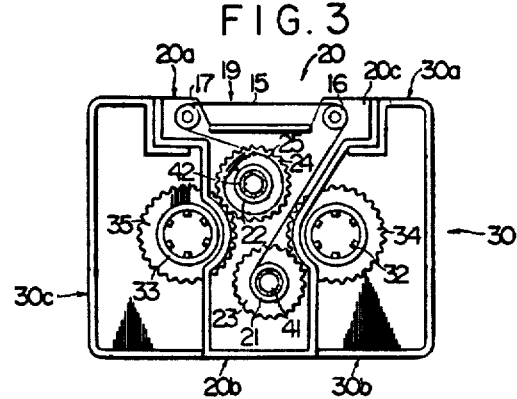
FIG. 3 is a plan view of a lower half of a tape cassette constructed in accordance with one embodiment of the invention and which comprises a combination of a miniature tape cassette and an adaptor.

FIG. 3 shows in plan view a combination of a miniature tape cassette 20 and an adaptor 30, the profile of the adaptor being of substantially the same configuration and size as the cassette 1 of standard size shown in FIG. 1. FIG. 3 specifically shows a lower half 20c, 30c of the miniature cassette and the adaptor, respectively. The adaptor 30 is provided with a T-shaped space 43 (see FIG. 4) which extends across the front and rear surfaces 30a, 30b thereof and into which the miniature cassette 20 is fitted. The space 43 extends from the upper surface of the adaptor into the interior thereof. When the miniature cassette 20 is fitted into the space 43, the combination provides a cassette of the same configuration and size as a standard cassette. Thus, when the miniature cassette 20 is combined with the adaptor 30 as shown in FIG. 3, the front and rear surfaces 20a, 20b of the miniature cassette 20 are flush with the front and rear surfaces 30a, 30b of the adaptor 30, respectively. The adaptor 30 internally houses a pair of tape hub-like transmission members 32, 33 rotatably disposed therein and which are similar in the shape and configuration of their inner diameter portions to the tape hubs 3, 4 shown in FIG. 1. A pair of gears 34, 35 are integrally arranged on the lower portion of the transmission members 32, 33 and in coaxial relationship therewith.

the miniature cassette is provided with a pair of rotatable tape winding hubs 21, 22, which are disposed intermediate the transmission members 32, 33 and are located on a line which is substantially perpendicular to a line joining the axes of these transmission members when the cassette is combined with the adaptor 30. A pair of gears 23, 24 are integrally arranged on the lower portion of these tape hubs 21, 22 in coaxial relationship therewith. When the miniature cassette 20 is combined with the adaptor 30, the gears 34, 35 mesh with the gears 23, 24, respectively. In order to avoid interference between the teeth of the respective gears when the miniature cassette is assembled with the adaptor, a relieving recess 44 is formed in the bottom of the adaptor 30 and the gear 34 is resiliently supported therein in a manner such that when the gear 34 cannot mesh with the gear 23, it may be depressed and then automatically rises when it comes into meshing engagement with the gear 23 as it rotates during the rotation of the transmission member 32. A similar arrangement is also utilized for the gear 33. A pair of locating pins 41, 42 are fixedly mounted centrally in the bottom surface of the adaptor 30 within the space 43 for engaging the tape winding hubs 21, 22 of the cassette 20 in order to locate the latter.

Figure 4:
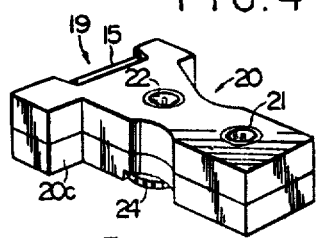
FIG. 4 is a perspective view of the miniature cassette when removed from the combination shown in FIG.3.

Each of the tape winding hubs 21, 22 and the transmission members 32, 33 is slightly rockable within an opening in which it is mounted, but they are held in place when the pins 41, 42 engage the tape winding hubs 21, 22. As shown in FIGS. 3 and 4, a notch 19 for pulling out the tape 15 is formed in a surface 20a of the miniature cassette 20 which is flush with the front surface 30a of the adaptor 30 when the cassette is combined with the latter and a pair of diverting rollers 16, 17 are disposed on the opposite sides thereof for maintaining the tape 15 in taut condition. As will be noted from a comparison of FIGS. 1 and 2 and FIG. 3, the tape winding hub 22 of the miniature cassette is located more toward the center of the cassette than is the hub 4 in cassette 2, so that the provision of diverting roller 8 shown in FIG. 1 is unnecessary, enabling a simpler, more compact construction of the miniature cassette 20.

Figure 5:
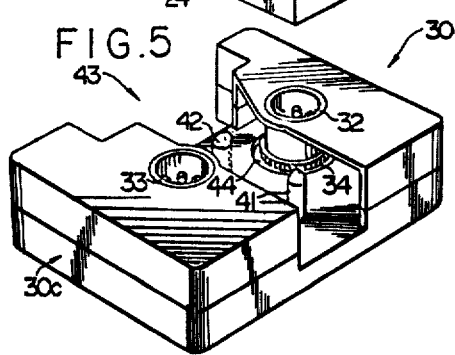
FIG. 5 is a perspective view of the adaptor shown in FIG. 3.

The use of the miniature cassette 20 and the adaptor 30 will now be described. Since the miniature cassette 20 has a size which is approximately one-third the size of a standard cassette, it is ideally suited for portable use and can be conveniently mounted in a video camera, which may be constructed in a simple and compact manner. However, since the present invention has no direct bearing with a video camera, a mounting of the cassette on the video camera will not be described. A playback operation of a recorded tape contained in the miniature cassette 20, when it is loaded on a video player adapted to play a standard cassette, will now be described. When the tape 15 contained in the miniature cassette 20 is recorded to its terminal end, the entire tape will be wound on one of the tape winding hubs, for example, on the hub 22 as shown in FIG. 3, where it will be noted that the diameter of the tape roll 25 will be at a maximum while the diameter of the tape roll on the hub 21 will be at a minimum. The cassette 20 is removed from the video camera under this condition, and is fitted into the cassette receiving space 43 in the adaptor 30 (see FIG. 5) so that the tape winding hubs 21, 22 are engaged with the pins 41, 42, respectively. In this instance, if the gears 23, 24 on the hubs 21, 22 do not properly mesh with the gears 34, 35 on the transmission members 32, 33 by interference due to misalignment, the gears 34, 35 can be depressed by the gears 23, 24 into the recesses 44 (the recess associated with the gear 35 being not shown). However, a slight rotation of the transmission members 32, 33 brings the gears 34, 35 into meshing engagement with the gears 23, 24, whereupon the gears 34, 35 rise under the resilient bias applied to them, thus completing the assemblying operation of the miniature cassette 20 and the adaptor 30. While not shown, a suitable clicking member is provided on the respective cooperating portions of assemblies 20 and 30 so that the fitting engagement therebetween is firmly maintained. The combined tape cassette which is assembled in this manner can be loaded on a video tape player, not shown, in the same manner as a standard cassette is loaded thereon.

Specifically, the axial bores of the transmission members 32, 33 are engaged with tape hub drive shafts of the video player, not shown. As the transmission members 32, 33 rotate, the gears 34, 35 integral therewith transmit the rotation through the meshing gears 23, 24, thus rotating the tape winding hubs 21, 22. In this manner, the tape can be pulled out of the notch 19 in the cassette 20, and passed around the rotary drum 10 (see FIG. 1) for purpose of reproducing the material recorded on the tape.

The length of the tape which can be contained within the miniature cassette 20 will be reduced to a fraction of the corresponding amount which can be contained in a standard cassette 1, but is still sufficient for practical purposes since the duration during which the picture of one scene is being taken will be five minutes at most. Thus it will be seen that there has been provided a tape cassette which is convenient for portable use and which does not require a specially designed video player.

What is claimed is:

1. For use in a cassette recorder designed to receive a tape cassette having a predetermined configuration and size, a miniature tape cassette and adaptor comprising:
    an adaptor having a first and second tape hub transmission members, each adapted to engage a different drive shaft of said recorder;
    a miniature tape cassette comprising a housing, first and second tape winding hubs mounted on said housing, an opening formed along one edge of said housing, a magnetic tape extending between said tape winding hubs and guide means for guiding said magnetic tape along said opening;
    said adaptor having a recess therein for receiving said miniature cassette when said miniature cassette is placed in operational engagement with said adaptor;
    means for causing said first and second tape winding hubs to rotate in response to rotation of said first and second tape hub tranmission members when said miniature tape cassette is placed in said recess;
    the configuration and size of the combined miniature cassette and adaptor when said miniature cassette has been placed within said recess being equal to said predetermined configuration and size; and
    the relative location of said miniature cassette and said adaptor when said cassette is placed in said recess being such that said opening in said miniature cassette lies along an outer edge of the combined cassette and adaptor whereby a magnetic pick-up of said recorder may directly contact said magnetic tape.

2. The miniature tape cassette and adaptor of claim 1, wherein said first and second tape winding hubs of said miniature tape cassette are disposed on a line substantially perpendicular to a line joining said first and second tape hub transmission members of said adaptor when said miniature tape cassette is placed within said recess of said adaptor.

3. The miniature tape cassette and adaptor of claim 1, wherein said means for causing said first and second tape winding hubs to rotate in response to rotation of said first and second tape hub transmission members comprises first and second transmission gears mounted for rotation with said first and second tape hub transmission members, respectively, and adapted to meshingly engage corresponding first and second gears on said first and second tape winding hubs, respectively.

4. The miniature tape cassette and adaptor of claim 3, further including means for resiliently mounting said first and second transmission gears on said adaptor, said resiliently mounting means permitting each said transmission gear to move out of the way of its respective first and second corresponding gear when said miniature cassette is placed within said recess and said first and second transmission gears do not properly mesh with their respective first and second corresponding gears, said resiliently mounting means also causing said first and second transmission gears to automatically move into meshing engagement with its respective first and second corresponding gear when said first and second tape hub tranmission members begin to rotate.

5. The miniature tape cassette and adaptor of claim 4, wherein said adaptor includes a pair of locating pins fixedly mounted within said recess and adapted to engage bores defined by said first and second tape winding hubs, respectively, thereby properly positioning said miniature cassette with respect to said adaptor.

6. The miniature tape cassette and adaptor of claim 5, wherein a notch is formed centrally in the front surface of said miniature tape cassette and wherein said miniature tape cassette further includes a tape wound about said first and second tape winding hubs and across a pair of diverting rollers which are positioned so as to extend said tape in taut condition across said notch whereby said tape may be pulled out of said notch to be passed around a rotary drum of a video player or like apparatus.

7. The miniature tape cassette and adaptor of claim 1, wherein said adaptor includes a pair of locating pins fixedly mounted within said recess and adapted to engage bores defined by said first and second tape winding hubs, respectively, thereby properly positioning said miniature cassette within said adaptor.

8. The miniature tape cassette and adaptor of claim 7, wherein said first and second tape winding hubs of said miniature cassette are disposed on a line substantially perpendicular to a line joining said first and second tape hub transmission members of said adaptor when said miniature cassette is placed within said recess of said adaptor.

9. For use in a cassette recorder designed to receive a tape cassette having a predetermined configuration and size, a miniature tape cassette and adaptor comprising:
an adaptor having first and second tape hub transmission members, each of said tape hub transmission members being designed to engage a different drive shaft of said recorder;
a miniature tape cassette having first and second winding hubs;
said adaptor having a recess therein for receiving said miniature cassette when said miniature cassette is placed in operational engagement with said adaptor;
means for causing said first and second tape winding hub to rotate in response to rotation of said first and second tape hub transmission members when said miniature tape cassette is placed in said recess, said means comprising first and second transmission gears mounted for rotation with said first and second tape hub transmission members, respectively, and adapted to meshingly engage corresponding first and second gears on said first and second tape winding hub, respectively;
the configuration and size of the combined miniature cassette and adaptor when said miniature cassette has been placed within said recess being equal to said predetermined configuration and size.

10. The miniature tape cassette and adaptor of claim 9, further including means for resiliently mounting said first and second transmission gears on said adaptor, said resiliently mounting means permitting each said transmission gear to move out of the way of its respective first and second corresponding gear when said miniature cassette is placed within said recess and said first and second transmission gears do not properly mesh with their respective first and second corresponding gears, said resiliently mounting means also causing said first and second transmission gears to automatically move into meshing engagement with its respective first and second corresponding gear when said first and second tape hub transmission members begin to rotate.

11. The miniature tape cassette and adaptor of claim 10, wherein said first and second tape winding hubs of said miniature cassette are disposed on a line substantially perpendicular to a line joining said first and second tape hub transmission members of said first adaptor when said miniature cassette is placed within said recess of said adaptor.

* * * * *